United States Patent [19]

Wallis et al.

[11] 4,306,601
[45] Dec. 22, 1981

[54] ELONGATE, DOUBLE-HINGED CARRYING CASE

[76] Inventors: Ruth M. Wallis; Lillian M. Finnern, both of P.O. Box 1888, Ontario, Calif. 91762

[21] Appl. No.: 181,952

[22] Filed: Aug. 27, 1980

Related U.S. Application Data

[63] Continuation-in-part of Ser. No. 950,716, Oct. 12, 1978, abandoned.

[51] Int. Cl.³ .............................................. B65D 11/00
[52] U.S. Cl. ............................. 150/52 R; 206/315 R; 206/523; 220/342; 43/26
[58] Field of Search ............... 206/315 R, 523; 43/26; 220/326, 342, 352, 353, 523, 66, 67; 150/52 R

[56] References Cited

U.S. PATENT DOCUMENTS

| | | | |
|---|---|---|---|
| 2,546,590 | 3/1951 | Ferrel | 220/342 X |
| 2,816,390 | 12/1957 | Vaughn | 43/26 |
| 3,348,329 | 10/1967 | Seemann | 43/26 |
| 3,384,221 | 5/1968 | Houtman | 206/523 |
| 3,425,587 | 2/1969 | Duross | 220/326 |
| 3,772,819 | 11/1973 | Ratzlaff | 43/26 |
| 4,151,912 | 5/1979 | Harrold | 206/523 |

FOREIGN PATENT DOCUMENTS

| | | | |
|---|---|---|---|
| 527635 | 4/1954 | Belgium | 150/52 |
| 801577 | 12/1950 | Fed. Rep. of Germany | 150/52 |
| 953035 | 9/1951 | Fed. Rep. of Germany | 150/52 |
| 304321 | 12/1932 | Italy | 150/52 |

Primary Examiner—Joseph Man-Fu Moy
Attorney, Agent, or Firm—John H. Crowe

[57] ABSTRACT

An elongate carrying case for fishing rods and the like including upper and lower covers hinged together along their lengths by a hinge member which permits relative pivoting movement of either cover about two separate parallel axes. Protective end caps prevent endwise movement of the covers relative to each other and also align the front and rear cover walls to permit proper closure of the case. The hinge member is formed with a pair of parallel cylindrical bearing sections separated by a flat, relatively thin web section. The rear walls of the upper and lower covers terminate in cylindrical bearing sockets with facing slotted openings in which the cylindrical bearing sections of the hinge member are pivotally seated. The slotted openings of the bearing sockets are wide enough to permit the covers to be pivoted about the bearing sections of the hinge member for purposes of opening and closing the case but narrow enough to prevent escape of the cylindrical bearing sections of the hinge member from the bearing sockets in which they are seated.

9 Claims, 5 Drawing Figures

U.S. Patent  Dec. 22, 1981  4,306,601
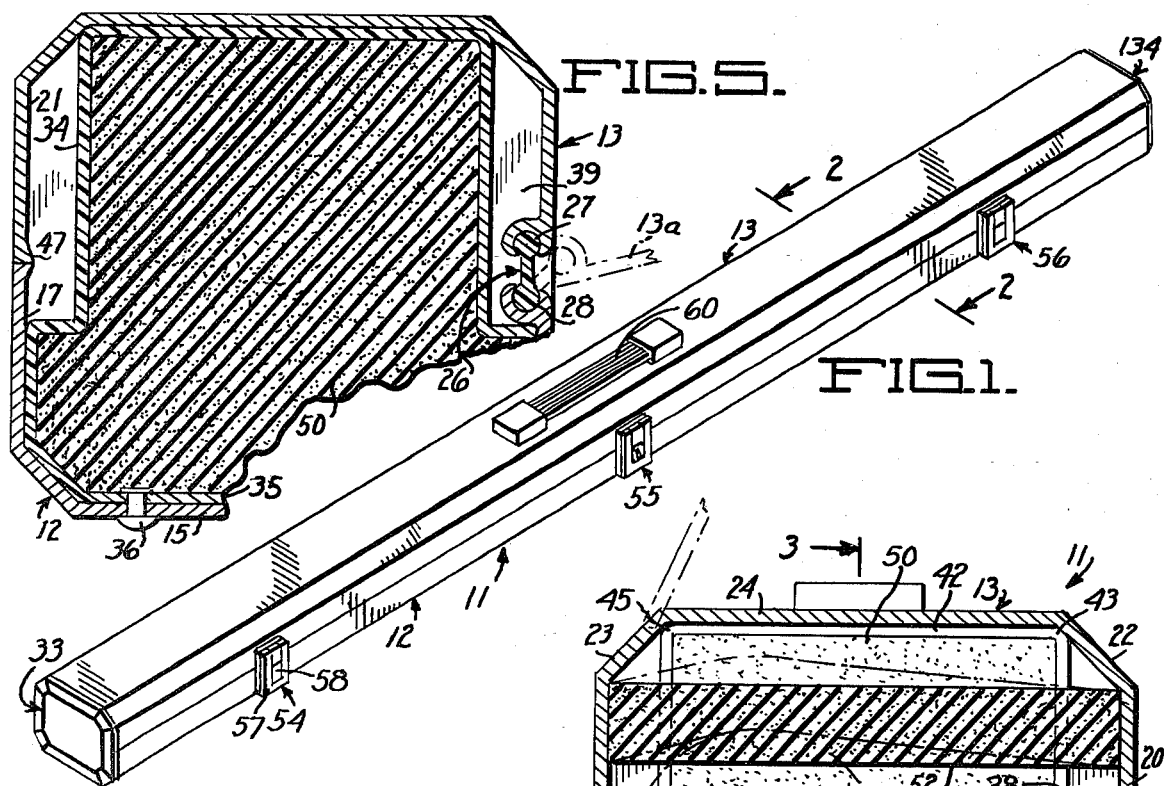
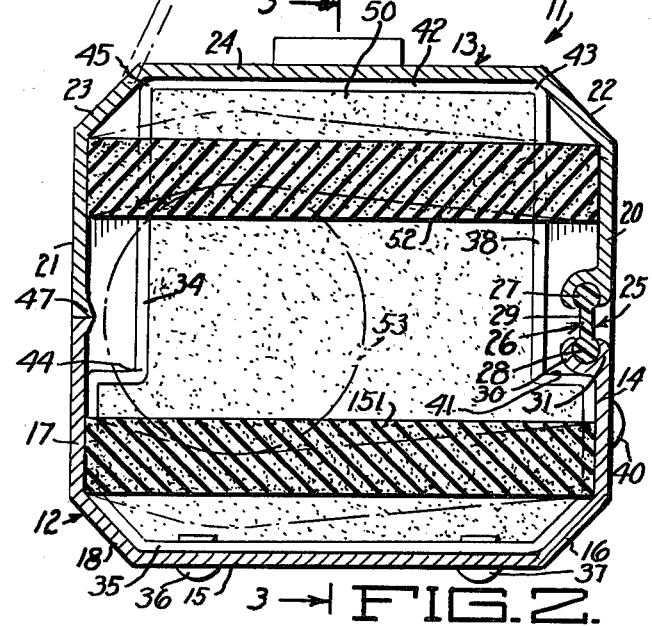
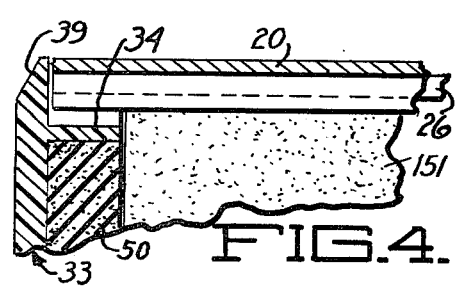
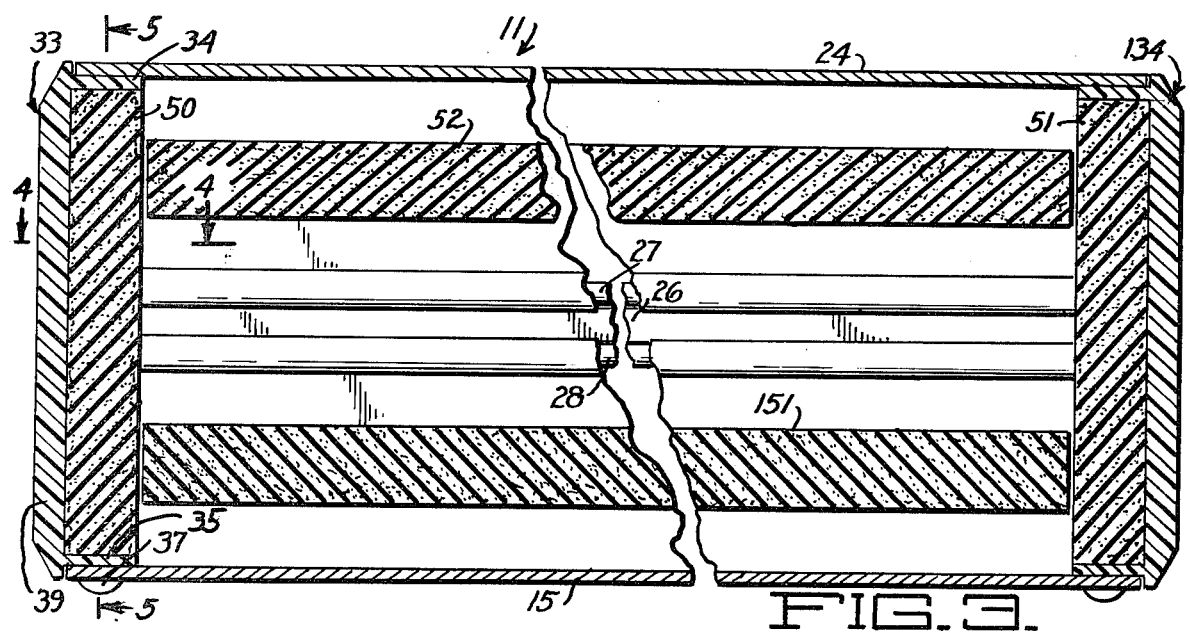

ELONGATE, DOUBLE-HINGED CARRYING CASE

CROSS-REFERENCE TO RELATED APPLICATION

This application is a continuation-in-part of our co-pending U.S. application Ser. No. 950,716, filed Oct. 12, 1978, now abandoned.

BACKGROUND OF THE INVENTION

This invention relates generally to carrying cases and more particularly to such cases suitable for holding elongate objects such as fishing rods, pool cues and the like.

It has heretofore been common practice to employ cylindrical tubes as carrying cases for fishing rods and similarly elongate items, the items being slid endwise into such a tube to load it and removed therefrom in the same endwise sliding manner. While such cylindrical tubes serve their purpose after a fashion, they have certain shortcomings. For example, it is generally inconvenient to insert items of considerable length, for example, six feet or more, into such tubes, or to remove the items therefrom. Also, fishing rods normally have fish line guides attached, which tend to become interlocked when more than one rod is fitted into a tube, making it necessary, in many cases, to slide all of the rods out together in order to select a particular one. Additionally, the presence of line guides and/or other attachments on fishing rods normally precludes the lining of tube interiors with padding or cushioning material since such attachments would have a tendency to damage the lining material as the rods are moved into and out of the tubes. Thus, such rods usually rattle when being transported in a tube container, which not only creates a noise nuisance, but can mar the rod surfaces. Finally, cylindrical tubes tend to roll about when being transported unless pains are taken to load them in such a way as to insure that they are wedged or otherwise secured against such movement.

U.S. Pat. No. 3,425,587 to Duross, Jr. discloses an elongate hinged container for fishing rods, or the like, that has certain advantages over cylindrical tubes, but does not overcome all of the above-mentioned shortcomings of those tubes. The Duross, Jr. container is formed from two "elongate container defining members", a first of which has a side wall "terminating in an engageable portion" and the second of which has a side wall "terminating in an engaging member". The "engaging member" of the second container defining member is engaged with the "engageable portion" of the first container defining member. The container opens and closes through the pivoting interaction of the "engaging member" of the second container defining member and the "engageable portion" of the first container defining member. Thus, the Duross, Jr. container has a hinge arrangement of conventional type in which pivoting movement between its container defining members takes place about a single hinge axis.

Any stress between the two container defining members of Duross, Jr. is transmitted directly from one to the other since their side walls are in direct contact throughout their lengths. In the case of those side walls meeting to form the above-described hinge, the stress transfer takes place at the hinge site. This results in vulnerability of the container to damage when it is subjected to undue stress, which can show up as wall or hinge deformation or fracture. The Duross, Jr. patent makes it clear that the hinged container defining members are formed of a rigid material, such as, for example, extruded aluminum or aluminum alloy, which, means that the container has little, if any, flexibility and must rely solely on the inherent strength and toughness of that material to resist such stress. In other words, the container has almost no shock absorbing ability and will therefore fracture or permanently deform when subjected to stress in excess of that which the inherent strength of the material of construction of its major components can withstand. Or, the parts of the hinge might separate before such damage occurs. In either case the container would be disabled, possibly beyond repair. Such inability to absorb physical stress beyond that which its walls alone can endure without damage is a disadvantage in a container for fishing rods because of the rough and abusive treatment such a container can be expected to receive under normal use conditions.

In addition to its obvious inability to absorb excessive stress without damage, the Duross, Jr. hinge arrangement, it seems to Applicants, leaves something to be desired in the way of dependable weather resistance over extended periods of time. Thus, this hinge arrangement, at least in preferred embodiments of the container, comprises interfitting parts of the same metal material from which the container walls are extruded, typically aluminum or an aluminum alloy, of relatively large surface area. Such a material might logically, we feel, be expected to lose its sealing effectiveness through corrosion and surface pitting upon prolonged exposure to harsh, corrosive environments, such as marine environments. By the same token, the hinge parts might be expected to lose some of their turning effectiveness as a result of such corrosion and even freeze up in extreme cases.

Because of the different configurations of their hinge side wall edges, the two container defining members of the Duross, Jr. container require separate extrusion, or other forming, steps. Another negative factor of present importance is an absence of any padding or cushioning means in the Duross, Jr. container.

SUMMARY OF THE INVENTION

We have now, by this invention, provided an elongate carrying case particularly suitable for use in the carrying of fishing rods and/or other elongate items. The carrying case comprises upper and lower covers having a continuous, double-jointed hinge arrangement therebetween by means of which the case can be opened and closed. This double-jointed hinge arrangement resides at the heart of our invention, and is designed, as will be seen, to provide shock absorbing resistance to stress on the case and to help keep moisture out of it. End caps are secured to one of the covers to enclose the ends of the case and to prevent moisture from entering said case at its ends when the covers are closed. The end caps also provide means for aligning the covers so that they properly meet when closed and to prevent longitudinal movement of the covers relative to one another at all times. By virtue of its double-jointed hinge arrangement, as will be seen, the carrying case of this invention is absent all but one of the above-noted disadvantages of the Duross, Jr. container. The remaining disadvantage, lack of internal padding or cushioning, is overcome in preferred forms of our invention by the utilization of pads of suitably compressible material in a manner presently to be revealed.

It is thus a principal object of the present invention to provide an elongate carrying case for fishing rods or the like with built-in shock absorbing resistance to abnormal shocks and stresses.

It is another object of the invention to provide such a carrying case of substantially weather resistant and watertight character.

Another object of the invention is to provide such a carrying case internally cushioned to prevent rattling, and for the protection, of its contents.

Still another object of the invention is to provide such a carrying case with upper and lower parts so hinged as to automatically interlock more securely against hinge separation when subjected to outside stresses.

A further object of the invention is to provide a method of making such a carrying case from extruded aluminum or the like requiring only a single extrusion operation.

Other objects, features and advantages of the invention will become apparent in the light of subsequent disclosures herein.

BRIEF DESCRIPTION OF THE DRAWINGS

FIG. 1 is a perspective view of a preferred embodiment of a carrying case in accordance with the present invention.

FIG. 2 is a cross-sectional view of the case, drawn to an enlarged scale, taken along line 2—2 of FIG. 1.

FIG. 3 is a longitudinal sectional view of the case, partly broken away, taken along line 3—3 of FIG. 2.

FIG. 4 is a fragmentary sectional view taken along line 4—4 of FIG. 3.

FIG. 5 is a cross-sectional view, partly broken away, taken along line 5—5 of FIG. 3.

DESCRIPTION OF THE PREFERRED EMBODIMENT

Referring now to the drawing, an illustrated carrying case in accordance with this invention is there shown generally at 11. Carrying case 11 comprises lower and upper covers 12 and 13, respectively, of similar construction and preferably formed of an extruded lightweight metal such as aluminum or one of the numerous aluminum alloys commercially employed for such extrusions. The lower cover 12 has an upstanding rear wall 14 which is joined to a bottom wall 15 by means of an inclined wall section 16. An upstanding front wall 17 is joined to the bottom wall 15 by another inclined wall section 18. The upper cover 13 comprises a downwardly extending rear wall 20 and a downwardly extending front wall 21, which walls are joined by inclined wall sections 22 and 23, respectively, to a top wall 24.

The covers 12 and 13 are of equal length and height and are hinged together along their lengths by a continuous hinge assembly, generally indicated at 25. This hinge assembly comprises an elongate hinge member 26, substantially equal in length to each of the covers 12 and 13, which extends along the length of the case. Hinge member 26 is formed from a suitably hard, tough, temperature-resistant material having the necessary qualities to serve in the capacity described hereinafter for extended periods without deterioration or noticeable loss of effectiveness. So far, the only material we have tested that meets these rigid requirements in ABS plastic, a commercially available plastic or well-known character. Insofar as temperature resistance is concerned, our carrying case with an ABS plastic hinge has been field-tested throughout the entire range of earthly temperatures from the blistering heat of the Arizona desert (120° F.) to the extreme cold of the Arctic (−150° F.) with no cracking, blistering, peeling, breaking or any other damage. Although we know of no other material, plastic or otherwise, adequately suitable for our purpose, we do not wish to rule out the possibility that some such material exists among the numerous commercial products on the market, or that such a material might, at some future time, be discovered.

Hinge members 26 has a pair of parallel cylindrical bearing sections 27 and 28 joined by a flat, relatively thin web section 29, such as shown in FIGS. 2 and 5. The bearing sections 27 and 28 are pivoted in cylindrical bearing sockets formed by spaced jaw sections 30 and 31 extending along the length of each of the rear cover walls 14 and 20, respectively. Each of the jaw sections 30 and 31 extends more than 180 degrees around the cylindrical bearing section pivoted therein to maintain the hinge member firmly in position. These jaw sections do not, however, extend all the way to the web section 29 of the hinge member, but terminate short of said web section, either side thereof, to permit rotation of the bearing sections in the bearing sockets to a sufficient extent to allow opening and closing of the case 11 in a soon to be described manner.

The hinge member 26 is sufficiently stiff and rigid so that its web section never bends across its width, but remains transversely flat at all times. As a result of this rigidity, the top and bottom covers of the carrying case open and close by relative rotation of the jaw sections 30 and 31 and bearing sections 27 and 28, respectively, of the hinge member, rather than by bending of the web section of that member. There is thus a double-hinge action in the opening and closing of the case, which, in addition to other advantages, prevents excessive wear, cracking, etc., of web section 29 of the hinge member. The illustrated hinge arrangement, moreover, by virtue of its unique design and the special characteristics of hinge member 26, is substantially watertight to prevent the entrance of moisture into case 11 when its covers are closed, as illustrated in FIGS. 1, 2, 3 and 5.

A pair of plastic end caps 33 and 134 are mounted on the ends of the lower cover 12 to enclose the ends of the case and keep out moisture when the case is closed. For the reasons indicated above in connection with hinge 26, caps 33 and 134 must have the same qualities of toughness, temperature resistance, etc., as it (hinge 26) has, hence must be made of ABS plastic or a material of like character, although, as we have indicated, we are presently unaware of any such material. These caps are of similar shape, each comprising an end wall 39 and an inwardly extending flange 34. The bottom section 35 of the flange 34 is secured by rivets 36 and 37 to the bottom wall 15 of the lower cover 12. The rear section 38 of the flange 34 is secured by a rivet 40 to the rear cover wall 14. The upper portion of the rear flange section 38 is offset inwardly at 41 to provide clearance for the parts of hinge assembly 25.

The offset section 41 of flange 34 joins a top section 42 of that flange to form a cover 43 at the juncture of the top wall 24 of the upper cover 13 and the inclined wall section 22 thereof. Likewise, an inwardly offset flange section 44 joins the top flange section 42 at a corner 45 located at the juncture of the top wall 24 and inclined wall section 23 of the top cover. When the covers 12 and 13 are in their closed position, top wall 24 of the latter rests directly on the upper flange section 42.

Accordingly, when the upper cover 13 is swung toward an open position, as partly indicated by the dot-dash lines 13a in FIG. 5, the cover can be pivoted about either or both of the axes of the cylindrical bearing sections 27 and 28 of the hinge member 26 to enable the lip 47 along the lower edge of the upper cover front wall 21 to easily clear the corner 45 of each end cover flange 34 and thereby allow full opening of the upper cover 13. However, when the upper cover 13 is moved toward a closed position, the inclined cover sections 22 and 23 cam along the corners 43 and 45 to guide the cover 13 into a position wherein its front wall 21 is in proper alignment with the front wall 17 of the lower cover 12. Consequently, when the covers 12 and 13 are in closed position, the walls 21 and 17 thereof will be held in alignment.

As will be seen, particularly in FIGS. 4 and 5, the end wall 39 of each end cap prevents endwise movement of the hinge member 26 and covers 12 and 13 relative to one another.

We have found our carrying case in its preferred form, constructed as described and illustrated herein, to be virtually indestructible under extremely rough treatment of a type that would destroy, or severely damage, any other fishing rod container of which we are aware. We have ascertained this by permitting persons having no interest in our product, other than a sincere desire to known how much abuse it can absorb, to toss our case around, kick it, stomp on it and even run over it with a car. In no instance did such treatment result in any significant damage to the case or significantly impair its serviceability. Moreover, we have proven our case capable of protecting its contents against water damage when exposed to wet weather or similarly adverse environmental conditions.

We believe the above-noted ability of our novel case to resist damage or destruction under extremely abusive conditions to be partly due to the fact that the top and bottom covers of the case, in its preferred form, are of extruded metal construction and therefore quite strong and tough, but in larger part to the fact that the rear walls of these covers are pivotally joined in parallel bearing sections of a hinge member running the full length of the two covers to thereby form a double-jointed hinge assembly. As previously indicated, this hinge member has a flat, relatively thin web interconnecting two bearing sections, and bearing sockets on said rear wall of jaw-like configuration extend more than 180 degrees (or more than halfway) around the bearing sections to pivotally lock the hinge member in place against separation under stress. The flat, relatively thin web section of the hinge member insures sufficient rotational tolerance in the double-jointed hinge assembly of our carrying case to give each of the two joints limited freedom to move, under stress, similarly to the way in which a ball-and-socket joint moves, and thereby absorb shock to prevent injury to the case when it is subjected to abusive treatment. In this connection, it should be noted that the two bearing socket edges of the rear walls of the two covers of the case are out of direct contact, although interconnected by said hinge member Consequently, the two rear walls are never in abutment under pressure, which would lead to damage of the case should the pressure exceed that which the strength of the material from which it covers are formed can withstand. To summarize, our double-jointed hinge assembly serves in a shock absorbing capacity to help protect our carrying case against damage or destruction under treatment that would deform or fracture parts of the case if it has a more conventional type of hinge assembly, such as that of Duross, Jr. Another advantage of our hinge structure, not heretofore mentioned, is the tight security it affords against unauthorized entry into our case. This is true because the jaw-like bearing sockets on the rear walls of the upper and lower covers of the case grip the hinge member interconnecting those walls so tenaciously that, for all practical purposes, it can only be separated by complete disassembly of the case.

Directing attention again to the drawing, padding is provided in carrying case 11 to cushion items therein against rattling or damage. For this purpose, end pads 50 and 51 of a resilient, compressible material, such as closed-cell PVC foam or polyurethane foam, are frictionally fitted within the flanges 34 of the end caps 33 and 134. Also, a pad 151 of such resilient material is frictionally fitted between the walls 14 and 17 of the lower cover 12 and engages the inclined wall sections 16 and 18 to space the pad above the bottom cover wall 15. A similar pad 52 is frictionally fitted between the walls 20 and 21 of the upper cover 13 and engages the inclined wall sections 22 and 23 to space the pad below the top cover wall 24. When a relatively large diameter item, as indicated by the dot-dash line 53, is mounted in the case, the pads 151 and 52 are compressed and deformed outwardly to provide a yieldable cushion for snugly supporting such an item against movement within the case. The pads serve a similar purpose when a number of smaller items are loaded in the case.

Locking devices 54, 55 and 56 are provided to selectively lock the upper and lower covers 12 and 13 of case 11 together in closed carrying or storing position. Such locking devices are of conventional construction, each comprising a U-shaped latch 57, pivotally supported at its upper end on the upper cover 13 and arranged to latch under a boss 58 carried by the lower cover 12. One of the three locking devices (55) includes a key-actuated lock, although this is not a critical feature and the devices can be all, or only partly, either latching or locking devices, as desired. A carrying handle 60 is centrally mounted on the upper cover 13.

It will be evident from the foregoing that since the covers 12 and 13 of case 11 are of equal height and thus split the case 11 along a mid-section when opened, any item may be easily and readily placed in or removed from the case without undue disturbance of other items in the case. Also, it will be seen that the pads 151 and 152 may be compressed and deformed against the bottom and top cover walls 15 and 24 to permit a maximum number of different items to be loaded into the case for substantially full utilization of the space therewithin.

Although our improved carrying case is particularly useful for the transportation and storage of elongate items, it can equally well be used to hold relatively short items, since in that case pads 151 and 52 serve to prevent such items from sliding endwise within the case.

As emphasized above, we believe our unique double-jointed hinge arrangement to be the key inventive feature of our carrying case because of the advantages accruing from our utilization of a hinge member made of a special material between two relatively rigid walls of the case (which hinge member has a flat, relatively thin web section between cylindrical bearing sections, to permit swinging movement of the two walls about two parallel axes, and is continuous from end to end of the case) to thereby prevent abutting contact between said walls when the case is subjected to stress and serve as shock absorbing means to give the case superior resistance to rough and abusive treatment. There is no prior art hinge structure of this type to our knowledge.

German Patent No. B29197 XII/81c to Brauch discloses a plastic "snap cover container" having a bottom part and a cover linked together along "hinge-side" edges with a plurality of hinge pieces (8, 8a) attachable to these edges. The edges and hinge pieces are so designed that the hinge pieces can be snapped into position on the edges in spaced relationship, as illustrated in FIGS. 5 and 6 of the Brauch patent. There are critical differences between the Brauch hinge design and our hinge structure which render the former inadequate for our primary purpose of providing a product inherently resistant to damage or destruction under conditions of extreme abuse. For instance, in the Brauch container, the spaced hinge pieces do not prevent meeting contact of portions of the hinge-side walls (between the hinge pieces) of its cover and bottom part when the container is closed (see FIGS. 1 and 3). Consequently, there is nothing between the cover and the bottom part of the container along their hinge-side edges to relieve stress and prevent grinding contact between portions of those edges when the container is subjected to stress, as opposed to our claimed double-jointed hinge structure which prevents such contact. Moreover, the Brauch hinge pieces are not the equivalent of our hinge member with its spaced bearing sections joined by a flat, relatively thin web section to give it flexibility of pivotal movement under stress and yield the stress relief advantages disclosed herein. Instead of having such a flat, relatively thin web section, each of the Brauch hinge pieces of closest relevance here (see FIG. 4) has a thickened center section from which thin, sharply curved portions extend to terminate in beads that fit into clamping sockets on Brauch's container walls that face away from each other, rather than toward each other as do our bearing sockets (See our FIG. 2). As a result of this design, compressive force or stress applied to the Brauch hinges acts in such a way as to urge the clamping sockets on the container walls away from the hinge piece beads coupled therewith. Consequently, such stress tends to cause disengagement of the container walls and hinge pieces. This is undesirable because it might well cause the hinge pieces to snap out of position (since they can be snapped into position, it stands to reason that they can also be snapped out of such position under stress). In view of the above, the Brauch hinge pieces obviously do not offer the same kind of security for the Brauch container as our claimed hinge arrangement does for our carrying case. This is not, of course, surprising, because the Brauch container is not intended for use as a carrying case for fishing rods or the like, hence need not be designed to withstand the kind of rough treatment encountered by fishing rod containers.

In contrast to the Brauch clamping sockets, the bearing sockets on the walls of our carrying case covers are vertically disposed with opening slots for our hinge member web in facing relationship. Thus, as will be apparent from our drawing (and particularly FIGS. 2 and 5), compressive stress on the covers of our case tends to tighten the connections between our bearing sockets and hinge member, to make our hinge structure more secure, rather than to loosen the hinge connections, as it does when applied to the cover and bottom part of the Brauch container. This pinpoints a key difference between the Brauch hinge design and ours and one which rules out suitability of the former for our purpose. Furthermore, Brauch's hinge assembly is massive relative to the size of his container and, as his FIG. 4 reveals, can be easily snapped apart when open. By contrast, our hinge assembly is small and indented (rather than protruding, as in the case of Brauch), and cannot be snapped apart when our case is open. It would be undesirable for our hinge structure to so easily come apart because it could lead to accidental separation of the carrying case covers under conditions conducive to frustration and/or actual loss of valuable fishing gear. For all of these reasons, the Brauch hinge assembly would be totally unsuitable for use of our carrying case.

While our novel carrying case has been herein illustrated and described in what we consider to be a preferred embodiment, it will be appreciated by those skilled in the art that our invention is not necessarily limited to that particular embodiment but is broad enough in concept to encompass any modification thereof incorporative of the structural and functional essence of the invention as taught herein, as long as it falls within the scope of the following claims.

We claim:
1. A carrying case comprising:
   an elongate bottom covering having relatively rigid, upwardly extending walls including a first rear wall;
   an elongate top cover having relatively rigid, downwardly extending walls including a second rear wall;
   said first rear wall terminating along its upper edge in a first cylindrical bearing socket having an upwardly facing slotted opening running from end to end therethrough;
   said second rear wall terminating along its lower edge in a second cylindrical bearing socket spaced vertically from said first cylindrical bearing socket and having a downwardly faced slotted opening running from end to end therethrough;
   a hinge member having a pair of spaced parallel cylindrical bearing sections joined by a flat, relatively thin web section, said hinge member being hard and stiff enough to insure substantial inflexibility of said web section in the transverse direction;
   one of said bearing sections being pivotally mounted in said first bearing socket and the other of said bearing sections being pivotally mounted in said second bearing socket so that said web section extends through the slotted openings of both bearing sockets whereby to form pivot joints and pivotally support the top and bottom covers for double-jointed swinging movement of either cover between closed and open positions relative to the other;
   the first and second bearing sockets being of jaw-like configuration in cross-section and extending for more than 180 degrees around the cylindrical wall of each of said bearing sections to thereby maintain said hinge member in position between said first rear wall and said second rear wall to pivotally support said top and bottom covers for said double-jointed swinging movement thereof;
   the top and bottom covers, first and second bearing sockets and hinge member being all of substantially the same length; and said hinge member serving, in addition to its hinge function, a shock absorbing function between the rear walls of said top and bottom covers when said carrying case is subjected to undue compressive stress while at the same time cooperating with the bearing sockets in said rear walls to tighten the pivot joints therebetween against separation under such stress.

2. A carrying case in accordance with claim 1 including:
end caps and means securing said end caps to the opposite ends of said bottom cover, said end caps serving to restrict endwise movement of said hinge member and said top and bottom covers relative to one another.

3. A carrying case in accordance with claim 2 including means on said end caps for aligning said walls of said top and bottom covers with each other when those covers are in closed position.

4. A carrying case in accordance with claim 3 in which said means on said end caps for aligning said walls comprises a flange on each end cap against which said top cover rests in closed position; and
said top cover has camming means thereon engageable with said flange for camming said top cover into alignment with said bottom cover when it is being swung into closed position.

5. A carrying case in accordance with claim 4 in which said top and bottom covers are of extruded aluminum construction.

6. A carrying case in accordance with claim 5 in which said hinge member and end caps are formed from a suitable plastic.

7. A carrying case in accordance with claim 6 in which said plastic is ABS plastic.

8. A carrying case in accordance with claim 7 wherein said bottom cover comprises a bottom wall joined to said upwardly extending walls by inclined wall sections and which includes a pad of compressible resilient material;
said pad being fitted between said upwardly extending walls, resting against said inclined wall sections, spaced from said bottom wall;
whereby said pad yields compressively and is deformed toward said bottom wall under pressure from an object placed between said covers, when the covers are in closed position, to serve as cushioning means for said object.

9. A carrying case in accordance with claim 8 wherein said top cover comprises a top wall joined to said downwardly extending walls by additional inclined wall sections and which includes a second pad of compressible resilient material;
said second pad being fitted between said downwardly extending walls, resting against said additional inclined wall sections, spaced from said top wall;
whereby said second pad yields compressibly and is deformed towards said top wall under pressure from said object placed between said covers, when the covers are in closed position, to further cushion said object.

* * * * *